United States Patent
Choi et al.

(10) Patent No.: US 11,429,339 B2
(45) Date of Patent: Aug. 30, 2022

(54) ELECTRONIC APPARATUS AND CONTROL METHOD THEREOF

(71) Applicant: SAMSUNG ELECTRONICS CO., LTD., Suwon-si (KR)

(72) Inventors: Kilsoo Choi, Suwon-si (KR); Kwansik Yang, Suwon-si (KR); Sehyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/075,379

(22) Filed: Oct. 20, 2020

(65) Prior Publication Data

US 2021/0117146 A1    Apr. 22, 2021

(30) Foreign Application Priority Data

Oct. 21, 2019 (KR) .......................... 10-2019-0130791

(51) Int. Cl.
*G06F 3/14* (2006.01)
*H04L 67/06* (2022.01)
(Continued)

(52) U.S. Cl.
CPC .......... *G06F 3/1454* (2013.01); *G06F 3/1415* (2013.01); *H04L 67/06* (2013.01);
(Continued)

(58) Field of Classification Search
CPC ...... G06F 3/048; G06F 3/0481; G06F 3/0484; G06F 3/0487; G06F 3/14; G06F 3/1415;
(Continued)

(56) References Cited

U.S. PATENT DOCUMENTS 9,661,266 B2 * 5/2017 Inoue .................... H04N 7/147
10,592,191 B2 * 3/2020 Kato ....................... H04N 7/15
(Continued)

FOREIGN PATENT DOCUMENTS

JP    2014-107865 A    6/2014
JP    2016-71638 A     5/2016
(Continued)

OTHER PUBLICATIONS

International Search Report (PCT/ISA/210) and Written Opinion (PCT/ISA/237) issued by the International Searching Authority in International Application No. PCT/KR2020/014341, dated Feb. 15, 2021.
(Continued)

*Primary Examiner* — Tom V Sheng
(74) *Attorney, Agent, or Firm* — Sughrue Mion, PLLC

(57) ABSTRACT

An electronic apparatus includes a processor configured to: display content as a first image including a playback area, transmit data of the first image to a first external apparatus, identify whether a first user input is to request a change in a playback area of a second image, based on the first user input generated in the first external apparatus, in which the content is being displayed as the second image including a playback area identical to the playback area of the first image, and, based on the identifying the first user input is to request the change in the playback area of the second image, transmit a request, to the first external apparatus, to display the content as a third image including a playback area different from the playback area of the first image and maintain the playback area of the first image on the display.

19 Claims, 13 Drawing Sheets

(51) Int. Cl.
  *H04L 67/10* (2022.01)
  *G06F 3/0481* (2022.01)
  *G06F 3/0487* (2013.01)
  *G06F 3/0484* (2022.01)

(52) U.S. Cl.
  CPC ............ *H04L 67/10* (2013.01); *G06F 3/0481* (2013.01); *G06F 3/0484* (2013.01); *G06F 3/0487* (2013.01)

(58) Field of Classification Search
  CPC ....... G06F 3/1454; H04L 67/06; H04L 67/10; H04N 21/4122; H04N 21/4126; H04N 21/41265; H04N 21/41407; H04N 21/43637; H04N 21/43076
  USPC ......................................................... 345/156
  See application file for complete search history.

(56) References Cited

U.S. PATENT DOCUMENTS

| | | |
|---|---|---|
| 2015/0082184 A1 | 3/2015 | Kim et al. |
| 2015/0095510 A1 | 4/2015 | Bhorkar et al. |
| 2015/0109344 A1* | 4/2015 | Tomono .................... G06T 1/20 345/661 |
| 2018/0070122 A1* | 3/2018 | Baek .............. H04N 21/440263 |
| 2018/0095326 A1* | 4/2018 | Lin ........................ G02B 26/04 |
| 2018/0103079 A1 | 4/2018 | Lewis et al. |
| 2018/0364881 A1* | 12/2018 | Lee ................ H04N 21/440245 |

FOREIGN PATENT DOCUMENTS

| | | |
|---|---|---|
| KR | 101218295 B1 | 1/2013 |
| KR | 10-2014-0000026 A | 1/2014 |
| KR | 101401525 B1 | 6/2014 |
| KR | 101446031 B1 | 10/2014 |
| KR | 101647111 B1 | 8/2016 |
| KR | 101890626 B1 | 9/2018 |

OTHER PUBLICATIONS

Communication dated Mar. 10, 2021, from the European Patent Office in European Application No. 20202843.7.
Communication dated Mar. 9, 2022, issued by the European Patent Office in counterpart European Application No. 20202843.7.

* cited by examiner

ELECTRONIC APPARATUS AND CONTROL METHOD THEREOF

CROSS-REFERENCE TO RELATED THE APPLICATION(S)

This application is based on and claims priority under 35 U.S.C. § 119 to Korean Patent Application No. 10-2019-0130791, filed on Oct. 21, 2019, in the Korean Intellectual Property Office, the disclosure of which is incorporated by reference herein in its entirety.

BACKGROUND

1. Field

The disclosure relates to providing image content to a display apparatus, and more particularly to performing an operation based on receiving a touch input while the image content is provided to a display apparatus based on mirroring from another apparatus.

2. Description of Related Art

To compute and process information in accordance with certain processes, an electronic apparatus includes a central processing unit (CPU), a chipset, a memory, and the like electronic components for the computation. For example, the electronic apparatus may be an information processing apparatus such as a personal computer (PC), a server or the like for processing information; an image processing apparatus for processing image data; an audio apparatus for audio processing; home appliances for miscellaneous household chores; etc. The image processing apparatus may be embodied by a display apparatus that displays an image based on processed image data on its display panel.

The display apparatus may be a stationary apparatus installed at one place like a television (TV) and a portable apparatus carried by a user like a mobile device. In particular, with development of wireless communication environments and development of a smartphone, a tablet computer and the like mobile device capable of utilizing the wireless communication environments, many users use personalized mobile devices. In this regard, there is a growing need for a link operation between a plurality of display apparatuses, for example, between the mobile device and the TV. Such a linking operation is based on wireless communication between the apparatuses, and mirroring as one example of the linking operation.

The mirroring refers to a function by which an image being displayed on a display apparatus is identically displayed on another display apparatus. For example, while a content image is displayed on a screen of a mobile device, the mobile device transmits content data to the display apparatus in real time to display the content image. The display apparatus displays the same image as the content image being displayed on the mobile device, based on the content data received from the mobile device.

When an image displayed on the mobile device includes an on-screen-display (OSD) menu for a user input, a user may touch the OSD menu on the screen of the mobile device to execute an operation corresponding to the touched OSD menu. However, in the related art, the display apparatus only displays the image received from the mobile device during the mirroring. Therefore, although the screen of the display apparatus is provided as the touch screen and a user touches the OSD menu on the screen of the display apparatus, the user is not allowed to execute the corresponding operation. In other words, during the mirroring, a playback state of the content image is controllable by touching the OSD menu on the screen of the mobile device, but not controllable through the screen of the display apparatus.

Further, in terms of mirroring image decoded in the mobile device to the TV, a network environment between the mobile device and the TV may affect a mirroring image displayed on the TV. For example, when a user wants that the mirroring image is displayed with a high resolution on the TV, a network bandwidth available for the mirroring between the mobile device and the TV might not be sufficient to transmit image data of such a high resolution.

Therefore, when a user input for viewing an image in a full screen mode is made through the OSD menu displayed on the screen of the TV during the mirroring, there might be a problem that the operation might not be properly carried out.

SUMMARY

In accordance with an aspect of the disclosure, there is provided an electronic apparatus including: a display; a communication circuit configured to communicate with a first external apparatus; and a processor configured to: display content as a first image including a playback area on the display, transmit data of the first image to the first external apparatus through the communication circuit, identify whether a first user input directs change in a playback area of a second image, in response to the first user input generated in the first external apparatus in which the content is displayed as the second image including the playback area identical to the playback area of the first image based on the received data, and maintain the playback area of the first image on the display, and transmit a request, which requests the first external apparatus to display the content as a third image including a playback area different from the playback area of the first image, through the communication circuit, based on the first user input identified to direct the change in the playback area of the second image.

The playback area of the third image may be larger than the playback area of the second image.

The request for displaying the third image may include at least one of a file of the content or address information from which the content is obtainable.

The second image may include a menu item for selecting the change in the playback area of the second image, and the processor may be configured to identify that the first user input directs the change in the playback area of the second image, based on whether coordinate information on a screen of the first external apparatus obtained from the first user input corresponds to a position of the menu item.

The processor may be configured to: transmit capture data of the first image to the first external apparatus through the communication circuit, based on a first transfer protocol, and transmit a request for displaying the third image based on a second transfer protocol different from the first transfer protocol, to the first external apparatus through the communication circuit.

The electronic apparatus may further include a user input receiver, wherein the processor may be configured to: identify whether a second user input generated through the user input receiver requests change in the playback area of the first image; display the content as a fourth image including a playback area different from the playback area of the first image on the display, based on the second user input identified to request the change in the playback area of the first image; and transmit capture data of the fourth image to the first external apparatus through the communication circuit.

The processor may be configured to: identify whether a third user input generated in the first external apparatus displaying the third image requests restoration to the playback area of the second image; and transmit the capture data of the first image again to the first external apparatus through the communication circuit, based on the third user input identified to request restoration to the playback area of the second image.

The electronic apparatus may further include a user input receiver, wherein the processor may be configured to: display a list of connectable second external apparatuses on the display and perform an outward casting operation for the content toward the second external apparatus, based on a fourth user input generated through the user input receiver and identified to request an outward cast for the content, and transmit the request for displaying the third image to the first external apparatus through the communication circuit without displaying the list, based on the first user input generated in the external apparatus and identified to request the outward cast for the content.

In accordance with an aspect of the disclosure, there is provided a method of controlling an electronic apparatus, including: displaying content as a first image including a playback area; transmitting data of the first image to a first external apparatus; identifying whether a first user input directs change in a playback area of a second image, in response to the first user input generated in the first external apparatus in which the content is displayed as the second image including the playback area identical to the playback area of the first image based on the received data; and maintaining the playback area of the first image, and transmitting a request, which requests the first external apparatus to display the content as a third image including a playback area different from the playback area of the first image, to the first external apparatus based on the first user input identified to direct the change in the playback area of the second image.

In accordance with an aspect of the disclosure, there is provided an electronic apparatus including: a display; a communication circuit configured to communicate with an external apparatus; and a processor configured to: display moving-image content as an image of a first form in a partial area of a screen, based on a user input for requesting the moving-image content to be displayed, transmit image data corresponding to the image of the first form to the external apparatus through the communication unit while displaying the image of the first form on the display, identify whether the user input directs change in a display form of the moving-image content, based on the user input generated in the external apparatus while the image data is being transmitted to the external apparatus, and maintain the image of the first form to be displayed on the display of the electronic apparatus, and transmit information for allowing the external apparatus to display the moving-image content, which is being displayed on the display of the electronic apparatus, in a second form, to the external apparatus through the communication unit, based on the user input identified to direct the change in the display form of the moving-image content.

The change in the display form may include change in the image size of the moving-image content displayed on the screen, and the image size of the moving-image content displayed in the second form may be larger than the image size of the moving-image content displayed in the first form.

The information about being displayed in the second form may include at least one of a file corresponding to the moving-image content stored in the storage unit of the electronic apparatus or address information from which the moving-image content is obtainable.

The image of the first form may include a user interface (UI) item provided to be selectable to change the display form of the moving-image content, and the processor may be configured to perform an operation for changing the display form of the moving-image content by a user input based on whether coordinate information of the user input obtained from the external apparatus corresponds to a position of the UI item.

The processor may be configured to transfer the image data to the external apparatus through the communication circuit based on a first transfer protocol and transfer information, which is for displaying the moving-image content in the second form, to the external apparatus through the communication circuit based on a second transfer protocol different from the first transfer protocol.

The electronic apparatus may further include a user input receiver, wherein the processor is configured to identify whether a second user input received through the user input receiver requests change in the display form of the moving-image content; display the moving-image content by changing the display form into the second form different from the first form, based on the second user input identified to request the change in the display form of the moving-image content; and transmit image data corresponding to the moving-image content being displayed in the second form to the external apparatus through the communication circuit.

The processor may be configured to identify whether a third user input generated in the external apparatus displaying the moving-image content in the second form requests restoration to the first form of the moving-image content; and transmit the image data corresponding to the image currently displayed on the electronic apparatus to the external apparatus through the communication circuit, based on the third user input identified to request the restoration to the first form of the moving-image content.

BRIEF DESCRIPTION OF THE DRAWINGS

The above and/or other aspects, features, and advantages of certain embodiments of the present disclosure will be more apparent from the following description, taken in conjunction with the accompanying drawings, in which.

DETAILED DESCRIPTION

Below, certain embodiments will be described in detail with reference to accompanying drawings. Further, embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

As used herein, the terms such as "1st" or "first," "2nd" or "second," etc., may modify corresponding components regardless of importance or order and are used to distinguish one component from another without limiting the components.

Further, a term "at least one" among a plurality of elements represents not only all the elements but also each one of the elements, which excludes the other elements or all combinations of the elements.

Figure 1:
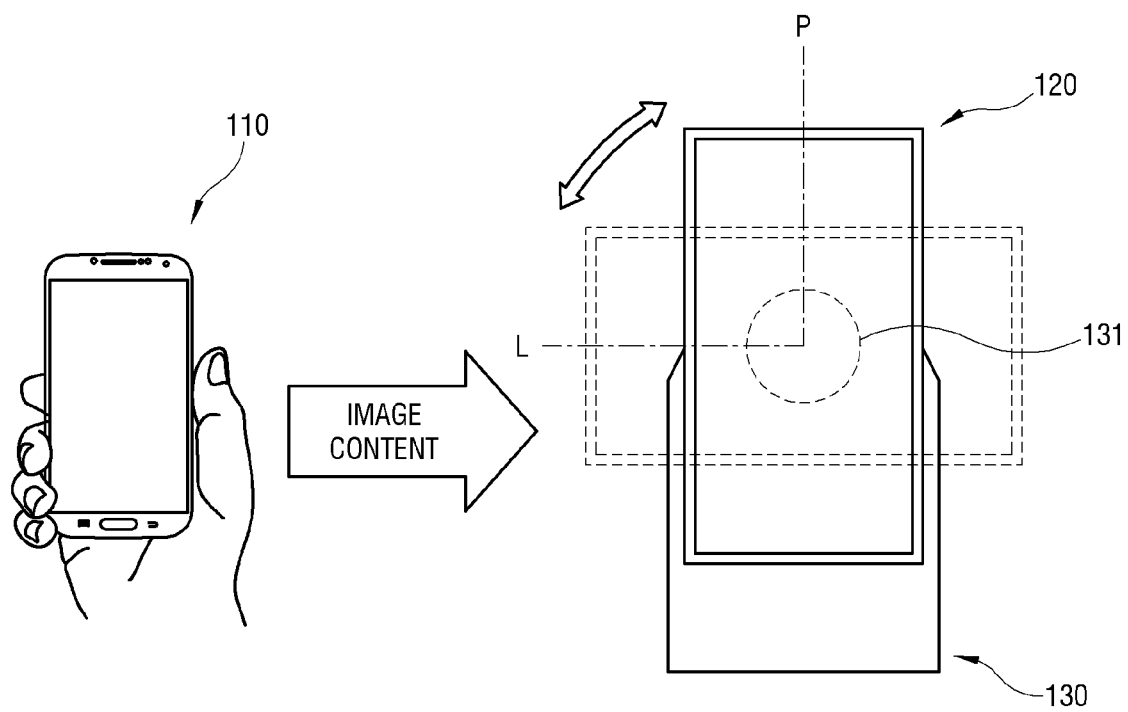
FIG. 1 illustrates a mobile device and a display apparatus according to an embodiment.

FIG. 1 illustrates a mobile device and a display apparatus according to an embodiment.

As shown in FIG. 1, an electronic apparatus and an external apparatus are provided to communicate with each other. In an embodiment, the electronic apparatus serves as a source device for providing image content, and the external apparatus serves as a sink device for receiving the image content from the electronic apparatus. For example, the electronic apparatus is a mobile device 110, and the external apparatus is a display apparatus 120. However, these are terms just for convenience to distinguish between the two apparatuses, and the terms do not limit the functions of the apparatuses.

The mobile device 110 may include various devices such as a smartphone, a tablet computer, a multimedia player, a wearable device, and the like having a screen for displaying an image. The electronic apparatus may be embodied by various devices such as a TV, a digital signage, an electronic frame, a computer with a monitor, or the like that is installed at a certain position stationary, as well as the mobile device 110 that is portable.

The display apparatus 120 includes a stand 130 installed on an installation surface, and is rotatably supported at one side of the stand 130. The stand 130 includes a motor 131 connected to the back of the display apparatus 120, and is driven by the motor 131 to rotate the display apparatus 120. The operation of the motor 131 may be controlled by a received control signal. The control signal transmitted to the motor 131 may be generated by a controller provided in the stand 130, or may be received from the display apparatus 120. Further, an instruction for generating such a control signal may be received from the stand 130 or a remote controller provided in the display apparatus 120.

Further, it may be designed to rotate only a display panel forming a screen of the display apparatus. In other words, a configuration such as a processor except the display panel may form a main body, and the display panel may rotate with respect to this main body.

The display apparatus 120 is provided to pivot with respect to a center area of the screen for displaying an image. The display apparatus 120 may pivot at least between a P-position and an L-position. The display apparatus 120 enters a vertical or portrait mode in which a vertical length is longer than a horizontal length when it is in the P-position, and enters a horizontal or landscape mode in which the horizontal length is longer than the vertical length when it is in the L-position.

An image or a UI displayed on the display apparatus 120 may correspond to one of the portrait mode and the landscape mode. Of course, the display apparatus 120 may display a landscape image in the portrait mode, and also display a portrait image in the landscape mode. However, in such a case, the screen and the image do not match in light of a ratio between the horizontal length and the vertical length. In other words, in such a case, an area where the image is not displayed, i.e., a margin is relatively large on the screen of the display apparatus 120. Further, a UI or an image may be designed to be adaptive to the landscape mode or the portrait mode.

Therefore, the display apparatus 120 displays a portrait image in the portrait mode and displays a landscape image in the landscape mode. For example, the display apparatus 120 operates in the landscape mode to display a broadcast image. Further, the display apparatus 120 operates in the portrait mode to display a mirroring image of the mobile device 110.

The mobile device 110 can wirelessly communicate with the display apparatus 120. The mobile device 110 can access the display apparatus 120 through a wide area network (WAN) or a local area network (LAN). For example, the mobile device 110 the mobile device 110 may perform communication with the display apparatus 120 based on Wi-Fi communication through an access point (AP) or may perform direct communication with the display apparatus 120 based on Bluetooth low energy (BLE).

Through such a communication route, the mobile device 110 may provide image content to the display apparatus 120. The display apparatus 120 may process the image content received from the mobile device 110 and thus display an image. There are many transfer protocols used for allowing the mobile device 110 to provide the image content to the display apparatus 120. For example, there are a mirroring transfer protocol and a cast transfer protocol, which will be described later.

Figure 2:
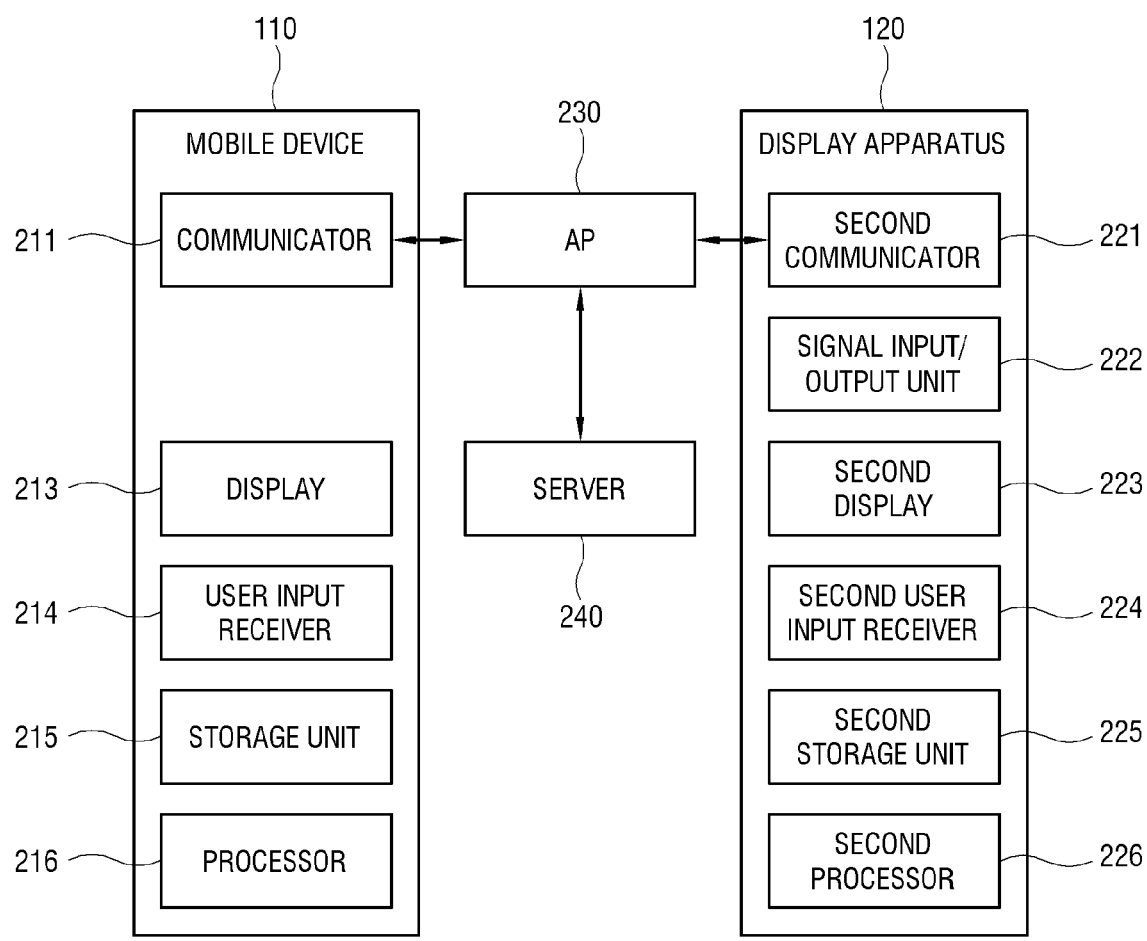
FIG. 2 is a block diagram of a display apparatus and a mobile device according to an embodiment.

FIG. 2 is a block diagram of a display apparatus and a mobile device according to an embodiment.

As shown in FIG. 2, a mobile device 110 includes a communicator 211, a display 213, a user input receiver 214, a storage unit 215, and a processor 216. A display apparatus 120 includes a second communicator 221, a signal input/output unit 222, a second display 223, a second user input receiver 224, a second storage unit 225, and a second processor 226.

The communicator 211 refers to an interactive communication circuit that includes at least one of elements, such as a communication module, a communication chip, etc. corresponding to various wired and wireless communication protocols. The communicator 211 supports one or more wireless communication standards, and includes a communication circuit, a communication chip or a communication module to perform communication based on the wireless communication standards. For example, the communicator 211 includes a communication circuit for one-to-one local area communication such as Bluetooth, BLE, etc. complying with institute of electrical and electronics engineers (IEEE) 802.15 standards. The communicator 211 includes a communication circuit for WAN-based communication such as Wi-Fi, etc. or wireless LAN communication complying with IEEE 802.11. Thus, the communicator 211 can communicate with the display apparatus 120 and a server 240 through an AP 230.

The display 213 includes a display panel capable of displaying an image on a screen. The display panel is provided to have a light receiving structure such as a liquid crystal, or a self-emissive structure such as an organic light emitting diode (OLED). The display 213 may include an additional element according to the structures of the display panel. For example, when the display panel is the liquid crystal, the display 213 includes a liquid crystal display panel, a backlight unit configured to emit light, and a panel driving substrate configured to drive liquid crystal of the liquid crystal display panel.

The user input receiver 214 includes circuit related to various input interfaces provided to be controlled by a user to thereby receive an input of a user. The user input receiver 214 may be variously configured according to the kinds of mobile device 110, and may for example include a mechanical or electronic button of the mobile device 110, a touch pad, a touch screen installed in the display 213, etc.

The storage unit 215 is configured to store various pieces of data. The storage unit 215 includes a nonvolatile storage and a volatile memory according to whether stored data is retained or not. The storage refers to a medium in which recorded data is retained even though power is not supplied, and includes a flash memory, a hard disc driver (HDD), a solid-state drive (SSD), a read only memory (ROM), etc. The memory refers to a medium in which recorded data is not retained while power is not supplied, and includes a buffer, a random-access memory (RAM), etc.

The processor 216 includes one or more hardware processors achieved by a CPU, a chipset, a buffer, a circuit, etc. which are mounted on a printed circuit board (PCB). As an example, the processor 216 may be designed as a system on chip (SoC). The processor 216 may execute an operating system of the mobile device 110 and applications corresponding to various functions. The processor 216 may play back image content stored in the storage unit 215 to be displayed as an image on the display 213, or provide the image content to the display apparatus 120.

The second communicator 221 refers to an interactive communication circuit that includes at least one of elements, such as a communication module, a communication chip, etc. corresponding to various wired and wireless communication protocols. The second communicator 221 supports for example Wi-Fi based wireless communication, thereby communicating with the mobile device 110 or the server 240 through an AP 230.

The signal input/output unit 222 is connected to an external apparatus such as a set-top box or an optical media player by one-to-one or one-to-many wired connection, thereby outputting receiving data from or outputting data to the external apparatus. The signal input/output unit 222 may for example include a connector, a port, etc. based on preset transfer protocols, such as a high definition multimedia interfaced (HDMI) port, DisplayPort, a universal serial bus (USB) port, etc.

The second display 223 displays an image based on an image signal processed by the second processor 226.

The second user input receiver 224 includes a circuit related to various kinds of input interfaces provided to be controlled by a user to receive a user input. For example, the second user input receiver 224 includes a physical or electronic button provided in the display apparatus 120, a remote controller separated from the display apparatus 120, a touch screen structure provided in the second display 223, etc.

The second storage unit 225 is configured to store data. The second storage unit 225 includes various kinds of storages and memories such as a flash memory, an HDD, an SSD, a buffer, a RAM, etc.

The second processor 226 includes one or more hardware processors achieved by a CPU, a chipset, a buffer, a circuit, etc. which are mounted on a PCB. As an example, the second processor 226 may be designed as a SoC. The second processor 226 includes modules corresponding to various processes, such as a demultiplexer, a decoder, a scaler, an audio digital signal processor (DSP), an amplifier, etc. to process an image. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC. Further, as one example of a designing method, when the display apparatus 120 is provided to be rotated by the motor of the stand, the second processor 226 may be electronically connected to the motor so that a control signal for driving the motor can be transmitted to the motor.

Figure 3:
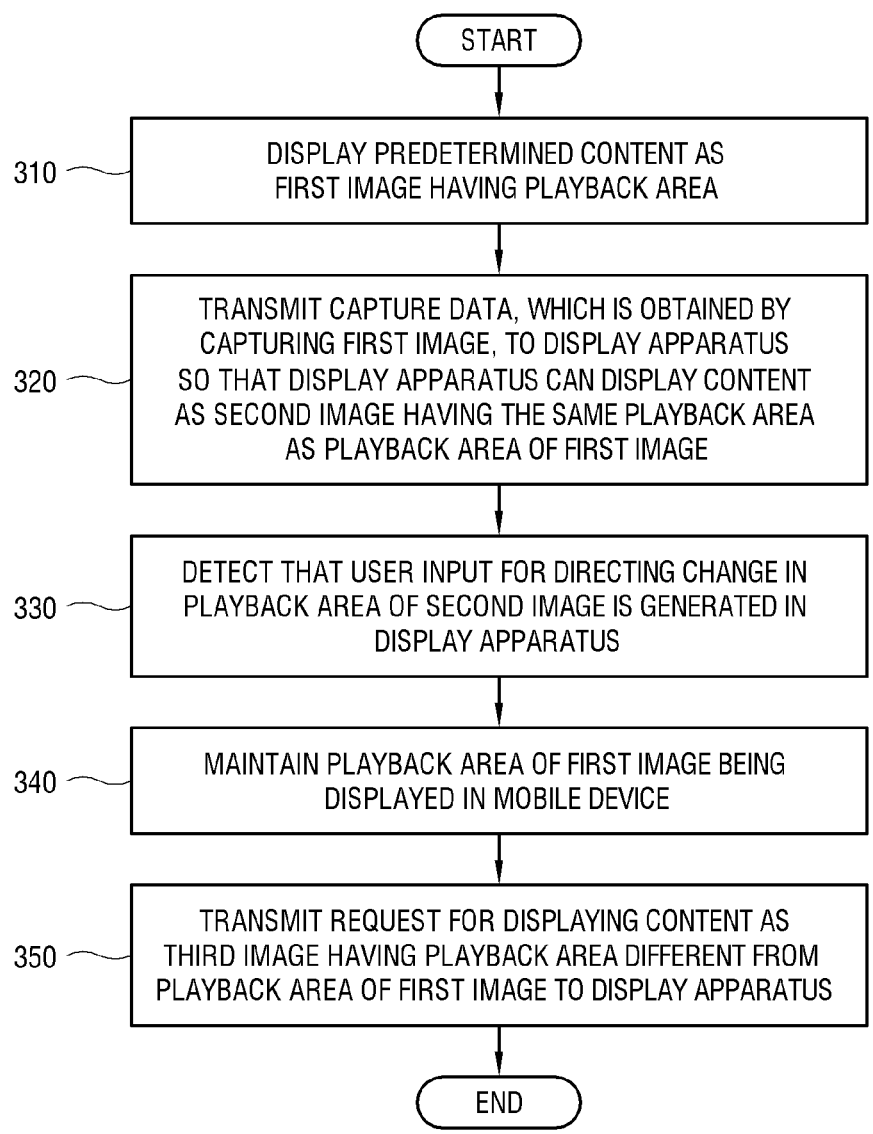
FIG. 3 is a flowchart showing a control method of a mobile device according to an embodiment.

FIG. 3 is a flowchart showing a control method of a mobile device performed by the processor of the mobile device, according to an embodiment.

At operation 310, the mobile device displays content as a first image having a playback area. The playback area of the content refers to an area, in which the corresponding content is displayed, within the entire area of a screen provided to display an image.

At operation 320, the mobile device transmits capture data, which is obtained by capturing the first image, to the display apparatus while displaying the first image. The capture data refers to data obtained by decoding the image content and buffered in order to display the first image in the mobile device.

The display apparatus receives the capture data, and displays the content as a second image having the same playback area as the playback area of the first image being displayed in the mobile device. The second image corresponds to a mirroring image of the first image because the second image is displayed based on the data decoded for the first image in the mobile device.

At operation 330, the mobile device detects whether a user input for changing the playback area of the second image is received in the display apparatus while the second image is being displayed in the display apparatus.

At operation 340, the mobile device maintains the playback area of the first image being displayed in the mobile device, in response to the user input. In other words, the mobile device maintains the current display state of the first image.

Further, at operation 350, the mobile device transmits a request for requesting the display apparatus to display the content as a third image having a playback area different from the playback area of the first image to the display apparatus, in response to the user input.

The display apparatus displays the third image changed from the second image, based on the request received from the mobile device. The third image is based on image content, which is the same as that of the second image, but displayed based on data of the image content transmitted by a transfer protocol, which is different from that of the second image. The second image is displayed based on mirroring of the image content, but the third image is displayed based on a cast of the image content.

Like this, when the user input for changing the playback area of the image is received in the display apparatus while the mobile device provides the image content so that the display apparatus can display the mirroring-based image, the mobile device controls the display apparatus to be switched to display the cast-based image. Thus, the mobile device may allow the display apparatus to adaptively display an image of a high resolution and high quality in response to a user's request.

The processor of the mobile device may perform at least a part of data analysis, data process and result information generation based on at least one of machine learning, neural network, deep learning algorithms as a rule-based or artificial intelligence (AI) algorithm in order to perform operations for maintaining the playback area of the first image and transmitting the request for requesting the display apparatus to display the third image, in response to the user input for changing the playback area of the second image as described above.

For example, the processor of the mobile device may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit of the mobile device or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding and/or removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent DNN (BRDNN) and deep Q-networks.

The recognizer may obtain target data to carry out the foregoing operations. The target data may be obtained from the storage unit of the mobile device or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

Figure 4:
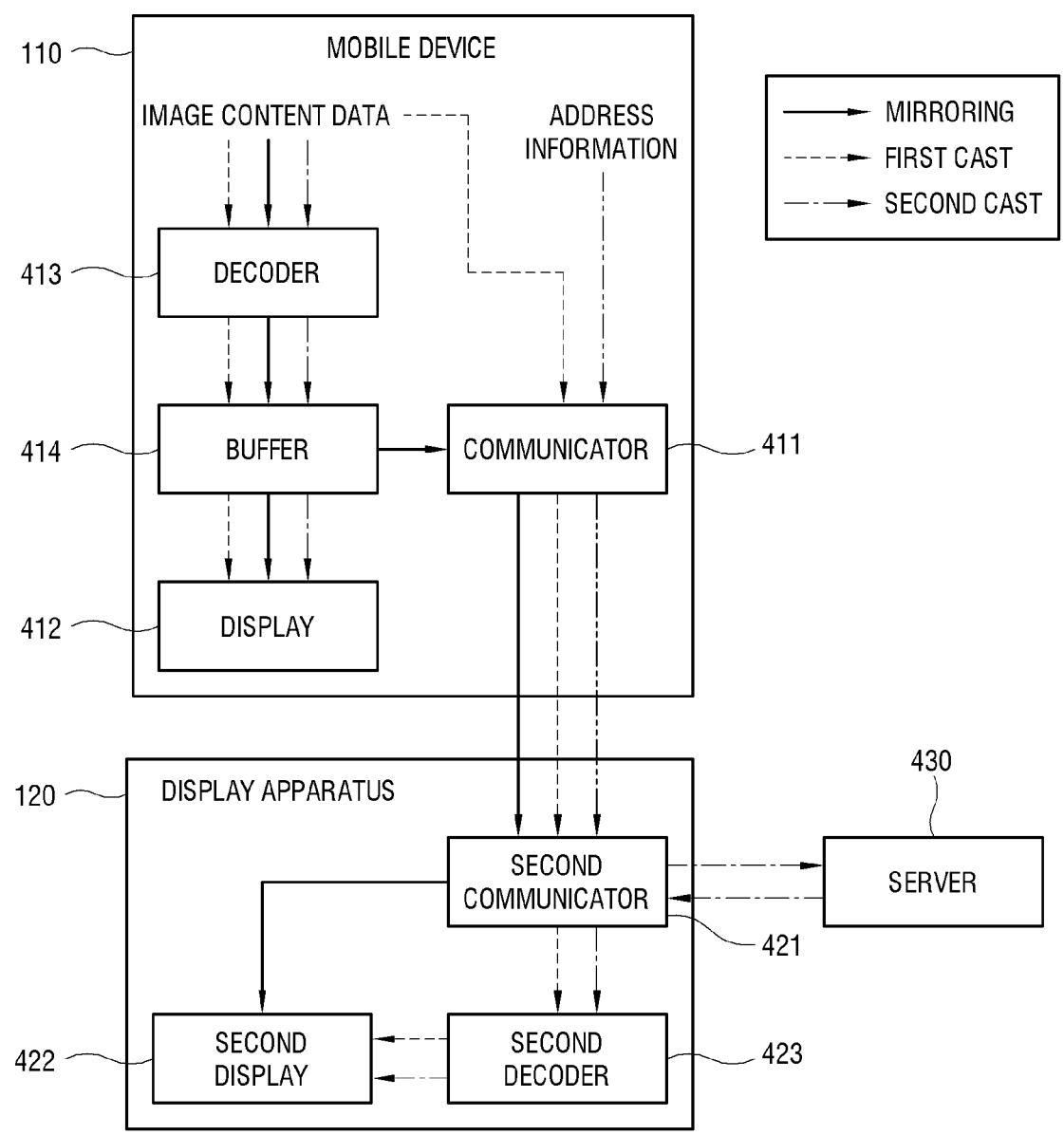
FIG. 4 is a block diagram showing signal flow based on a transfer protocol between a mobile device and a display apparatus according to an embodiment.

FIG. 4 is a block diagram showing signal flow based on a transfer protocol between a mobile device and a display apparatus according to an embodiment.

As shown in FIG. 4, a mobile device 110 obtains predetermined image content data. The mobile device 110 may obtain the image content data from the outside or inside. For example, the mobile device 110 may load the image content data stored in the storage unit or receive the image content data from a server 430.

The mobile device 110 includes a communicator 411, a display 412, a decoder 413, and a buffer 414. The decoder 413 may be embodied as a single chip together with the processor of the mobile device 110 or as a separate chip from the processor. The decoder 413 decodes the obtained image content data and buffers the decoded data to the buffer 414. The data buffered to the buffer 414 is output from the buffer 414 to the display 412 on a displaying timing of an image, so that the image can be displayed on the display 412. In other words, the data buffered to the buffer 414 is given as decoded by the decoder 413. For convenience of description, the image displayed on the display 412 of the mobile device 110 is referred to as a first image.

A display apparatus 120 includes a second communicator 421, a second display 422, and a second decoder 423. The display apparatus 120 may display an image based on the same image content as that of the first image being displayed on the mobile device 110, by a mirroring method or a cast method.

According to the mirroring method, the mobile device 110 transmits the image content data, which is buffered to the buffer 414, to the display apparatus 120 through the communicator 411. In other words, the data buffered to the buffer 414 is transmitted to both the display 412 and the communicator 411. When the data from the mobile device 110 is received in the second communicator 421, the display apparatus 120 transmits the received data to the second display 422 without decoding the received data through the second decoder 423. For convenience of description, the image displayed on the second display 422 by this process is referred to as a second image.

In the mirroring method, the first image and the second image are all the decoding outputs of the decoder 413 of the mobile device 110. In other words, the second image is not a product of the second decoder 423 of the display apparatus 120, but is a product of the decoder 413 of the mobile device 110.

According to the cast method, the mobile device 110 transmits not the image content data buffered to the buffer 414 but original image content data not decoded by the decoder 413 to the display apparatus 120 through the communicator 411. As another example, the mobile device 110 does not directly transmit content of content to the display apparatus 120, but may provide information about an address at which the display apparatus 120 can obtain the data of the content. When the data from the mobile device 110 is received in the second communicator 421 of the display apparatus 120, the display apparatus 120 decodes the received data through the second decoder 423 and transmits the decoded data to the second display 422. For convenience of description, the image displayed on the second display 422 by this process is referred to as a third image.

In the cast method, the first image is the decoding output of the decoder 413 of the mobile device 110, whereas the third image is the decoding output of the second decoder 423 of the display apparatus 120. In other words, the third image is an output caused by different decoding from that of the second image even though it is based on the same image content as that of the second image. For example, a cast method may be performed via a digital living network alliance (DLNA).

The cast method may include a first cast method of the foregoing example and a second cast method as follows. In a case of the second cast method, the mobile device 110 does not transmit undecoded original image content data to the display apparatus 120, but transmits address information of the server 430, from which the data is obtainable, to the display apparatus 120 through the communicator 411. The display apparatus 120 accesses the server 430 based on the received address information, and receives the image content data stored in the corresponding address information. The display apparatus 120 decodes such received data through the second decoder 423 and displays the decoded data on the second display 422.

The image content data for displaying the third image may be directly transmitted to the display apparatus 120 by the mobile device 110, or may be obtained by the display apparatus 120 based on the address information provided by the mobile device 110. In both cases, the data obtained by the display apparatus 120 is decoded by the second decoder 423.

As described in detail below, the mobile device 110 and the display apparatus 120 display images according to transfer protocols and the images are changed according to switching of the transfer protocol.

Figure 5:
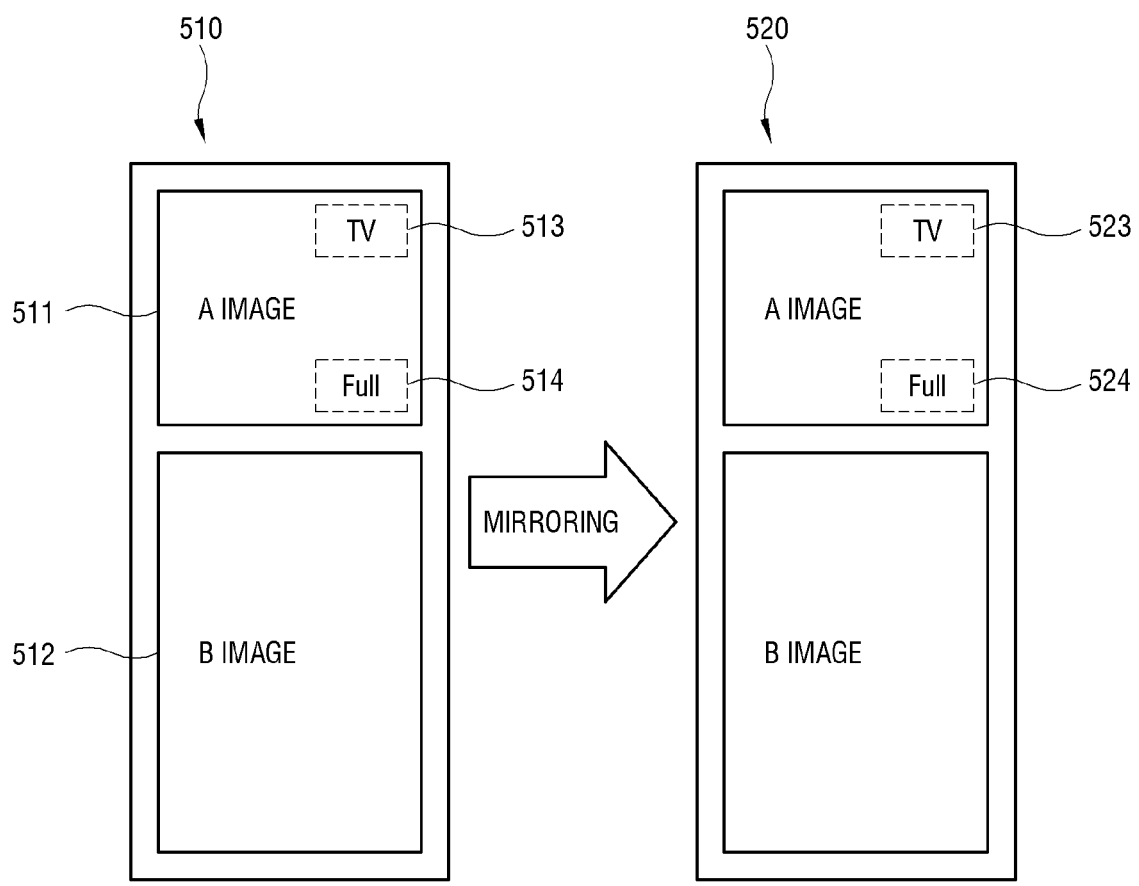
FIG. 5 illustrates images respectively displayed on a mobile device and a display apparatus during mirroring according to an embodiment.

FIG. 5 illustrates images respectively displayed on a mobile device and a display apparatus during mirroring according to an embodiment.

As shown in FIG. 5, the mobile device has a first screen for displaying an image, and the display apparatus has a second screen 520 for displaying an image. When mirroring of an image is performed while the mobile device is displaying the image on the first screen 510, the display apparatus displays a mirroring image of the image on the second screen 520. When the display apparatus is pivotally provided to switch over between a portrait mode and a landscape mode, the display apparatus may control the display having the second screen 520 to enter the portrait mode in response to the mirroring.

The mobile device may display a plurality of images together within the entire playback area of the first screen 510 capable of displaying an image. The mobile device displays an A image 511 based on predetermined content in a partial playback area of within the entire playback area of the first screen 510 capable of displaying an image. The mobile device may display an image based on different content, i.e., a B image 512 in the other playback area within the entire playback area of the first screen 510.

For example, when the mobile device is accessing a moving-image content service provided through the Internet, the A image 511 may be a playback image based on moving-image content, and the B image 512 may be a list of content provided by the service. In addition, the A image 511 may display various options related to the content being played back, or options for adjusting the playback state of the content. For example, the A image 511 may display an outward casting option 513, i.e., a UI TV in FIG. 5, for displaying the A image 511 on the display apparatus or the like external apparatus, a full-screen option 514, i.e., a UI Full in FIG. 5, for displaying the A image 511 as a full screen, etc.

The outward casting option 513 refers to an option for directing the content of the A image 511 to be casted to an apparatus selected among many external apparatuses such as the display apparatus so that the selected apparatus can display a cast-based image.

The full-screen option 514 refers to an option for directing the playback area of the A image 511 to be changed into the full screen. An embodiment describes the full-screen option 514, but another option for expanding the playback area of the A image 511 into not the full screen but a relatively large area or reducing the playback area of the A image 511 is also possible.

The mobile device may perform the mirroring by executing an application supporting a mirroring function. The mobile device transmits capture data, which is obtained by capturing the entire image of the first screen 510 including the A image 511 and the B image 512, to the display apparatus. The capture data may be data buffered to display the entire image including the A image 511 and the B image 512 decoded by the decoder on the first screen 510. The display apparatus displays the mirroring image on the second screen 520 based on the capture data received from the mobile device.

The image displayed on the second screen 520 is based on the mirroring, and therefore has the same form as the image displayed on the first screen 510. In this state, the operations of the mobile device and the display apparatus of when a user touches the outward casting option 513 or the full-screen option 514 displayed on the first screen 510 may be different from those of when a user touches the outward casting option 523 or the full-screen option 524 displayed on the second screen 520, i.e., a UI TV or a UI Full, respectively, as shown in FIG. 5.

In an embodiment, four touch input scenarios are possible as follows: a user may touch the full-screen option 514 of the first screen 510; the outward casting option 513 of the first screen 510; the full-screen option 524 of the second screen 520; or the outward casting option 523 of the second screen 520. In particular, the operation performed in the mobile device when a user touches the full-screen option 514 of the first screen 510 is different from that when a user touches the full-screen option 524 of the second screen 520.

The outward casting option 513 and the full-screen option 514 displayed on the first screen 510 are menus generated by the mobile device. Therefore, when a user touches the outward casting option 513 or the full-screen option 514, the mobile device can easily identify that the outward casting option 513 or the full-screen option 514 is touched. However, the mirroring image displayed on the second screen 520 is decoded by not the display apparatus but the mobile device, and the display apparatus only displays the mirroring image. In other words, the outward casting option 523 and the full-screen option 524 displayed on the second screen 520 are not the menus generated by the display apparatus.

Therefore, when a user touches the outward casting option 523 or the full-screen option 524 displayed on the second screen 520, the mobile device or the display apparatus uses the described-below method to identify such a touch input.

Figure 6:
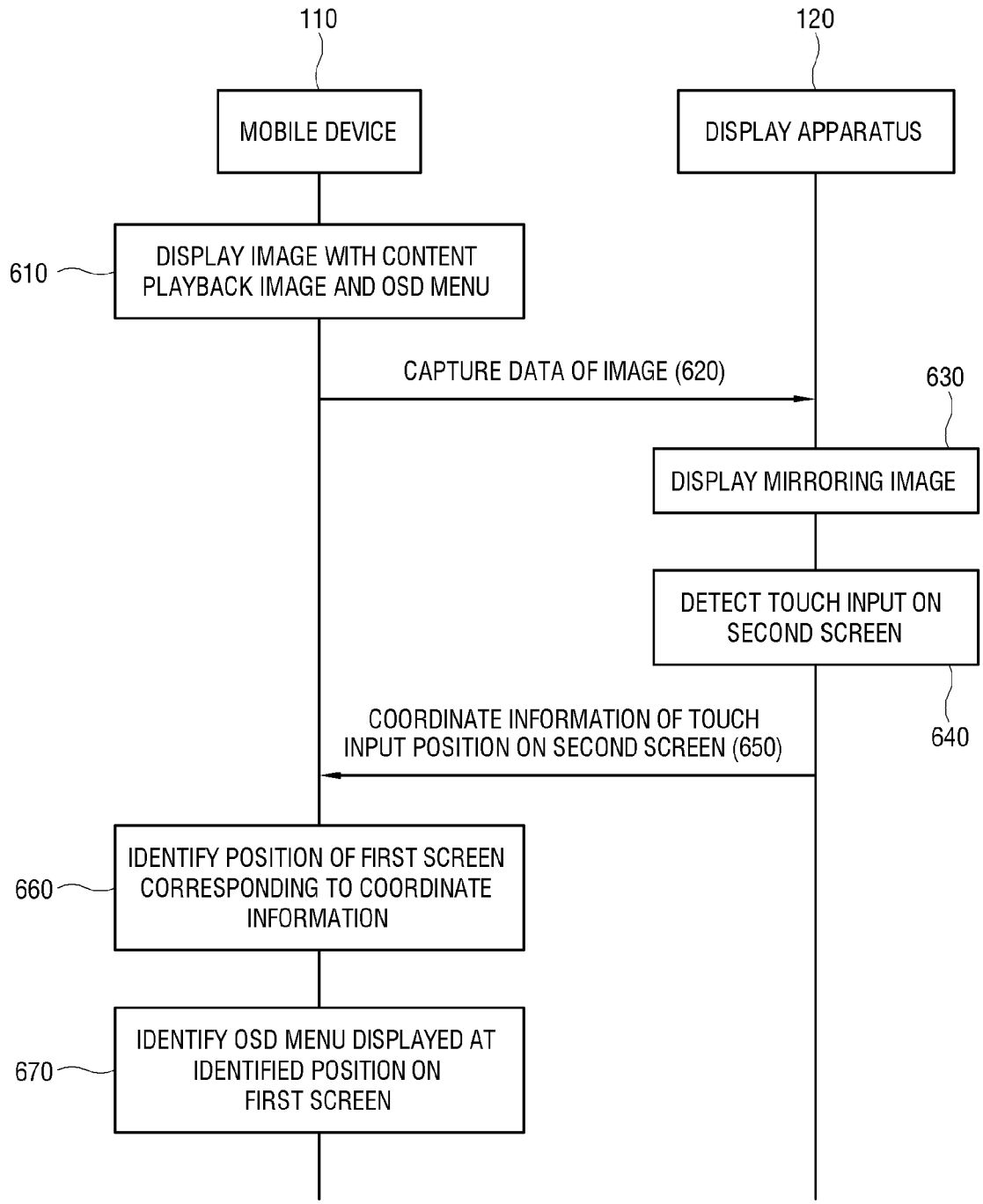
FIG. 6 illustrates a method by which a mobile device identifies an event corresponding to a touch input occurring in a display apparatus during mirroring according to an embodiment.

FIG. 6 illustrates a method by which a mobile device identifies an event corresponding to a touch input occurring in a display apparatus during mirroring according to an embodiment.

As shown in FIG. 6, a mobile device 110 and a display apparatus 120 perform communication to exchange information with each other.

First, the display apparatus 120 detects a touch input on a second screen. Various technologies may be applied to a structure for detecting the touch input. For example, the display apparatus 120 may have a structure where pressure-sensitive or capacitive touch sensing films are stacked on a display having the second screen. As another example, the display apparatus 120 may have a structure that includes a plurality of infrared sensors arranged surrounding the second screen, and detects infrared interference occurring when touched by a user.

At operation 610, the mobile device 110 displays a playback image of content and an image including an OSD menu. The mobile device 110 displays an option with the OSD menu on the playback image of the content while playing back the content.

At operation 620, the mobile device 110 provides capture data of the displayed image to the display apparatus 120.

At operation 630, the display apparatus 120 displays a mirroring image of the image displayed on the mobile device 110 based on the provided capture data.

At operation 640, the display apparatus 120 detects a touch input on the second screen.

At operation 650, the display apparatus 120 transmits coordinate information about a position on the second screen, in which the touch input is detected, to the mobile device 110. The coordinate information may for example include X and Y coordinates of the touch position on the second screen, or coordinates of a pixel area corresponding to the touch position among all of the pixels of the second screen.

At operation 660, the mobile device 110 identifies the position on a first screen corresponding to the coordinate information received from the display apparatus 120. When the second screen and the first screen are different in size from each other, the mobile device 110 may identify the touch position by matching the coordinate information on the second screen to the first screen, based on a ratio between the size of the second screen and the size of the first screen.

At operation 670, the mobile device 110 identifies the OSD menu displayed at the identified position on the first screen. Thus, the mobile device 110 identifies that the OSD menu displayed on the second screen of the display apparatus 120 is touched by a user during the mirroring.

Figure 7:
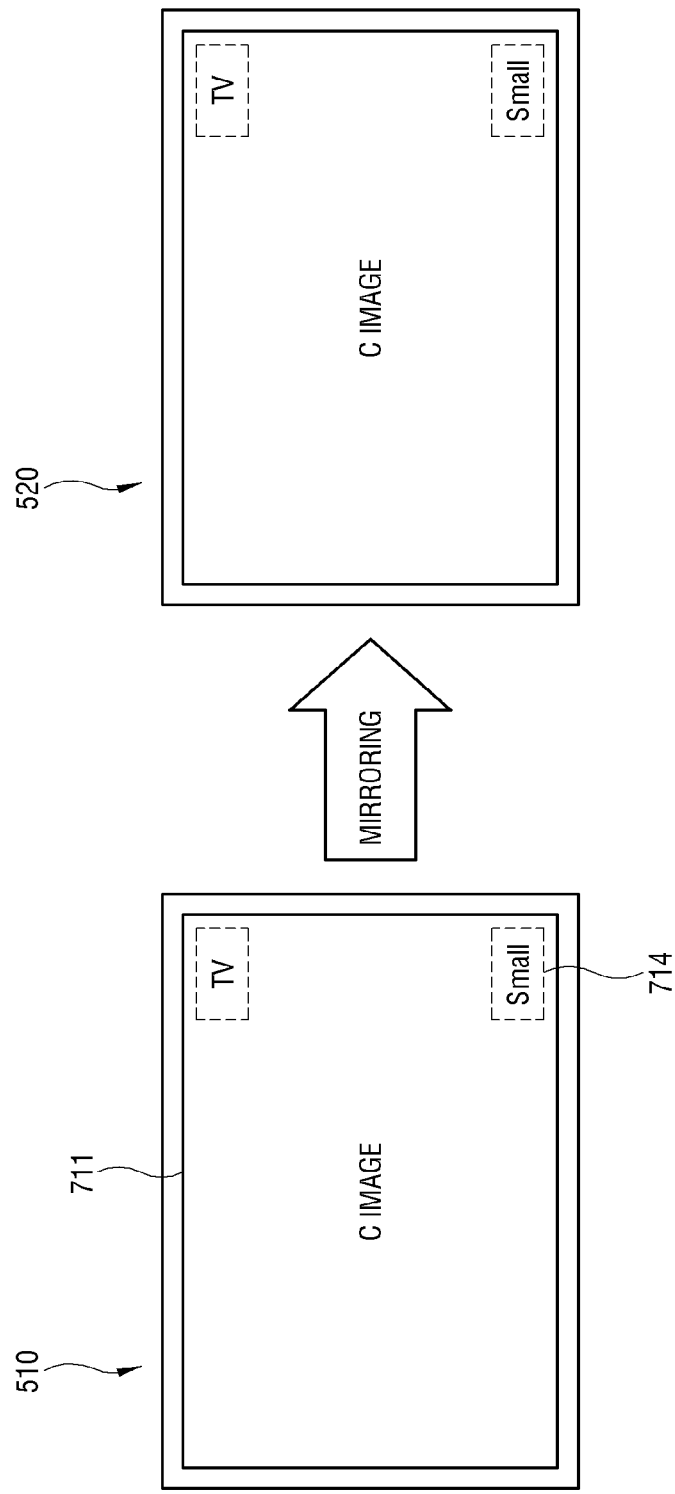
FIG. 7 illustrates an image displayed when a user touches a full-screen option for a first screen in the state of FIG. 5 according to an embodiment.

FIG. 7 illustrates an image displayed when a user touches a full-screen option for a first screen during the mirroring operation illustrated in FIG. 5, according to an embodiment.

With reference to FIGS. 5 and 7, when a user touches the full-screen option 514 for the first screen 510, the mobile device displays a C image 711. The C image 711 is an image of playing back the same image content as the A image 511, and has a playback area enlarged from the playback area of the A image. In other words, the C image 711 is a full-screen image obtained by enlarging the A image. When the display apparatus is pivotally provided to switch over between the portrait mode and the landscape mode, the display apparatus may control the display having a second screen 520 to enter a landscape mode in response to this touch input.

The C image 711 is the image of which the playback area is expanded into the full screen, and may additionally display a size-restoring option 714, i.e., a UI Small, for receiving an input requesting a restoration to an original size of the playback area, e.g., a size during the mirroring operation. As another example, the C image 711 may display a UI for receiving an input requesting a reduction in size of the playback area as compared to an original size. When the size-restoring option 714 is touched, the playback area of the C image 711 is reduced into that of the A image.

Like this, when the touch input is made to the full-screen option on the first screen 510, the mobile device continues to maintain the transfer protocol in the mirroring state, and changes the state of the image on the first screen 510 based on the full-screen option. As the mirroring state is maintained, the display apparatus continues to receive and display the capture data of the C image 711 from the mobile device. Therefore, the state of the image displayed on the first screen 510 is intactly reflected in the image displayed on the second screen 520, and thus the mirroring image of the second screen 520 shows the form of the C image 711 of the first screen 510 as before.

As described in detail below, operations when the full-screen option 524 for the second screen 520 is touched during the mirroring operation are different from when a user touches the full-screen option 514 for the first screen.

Figure 8:
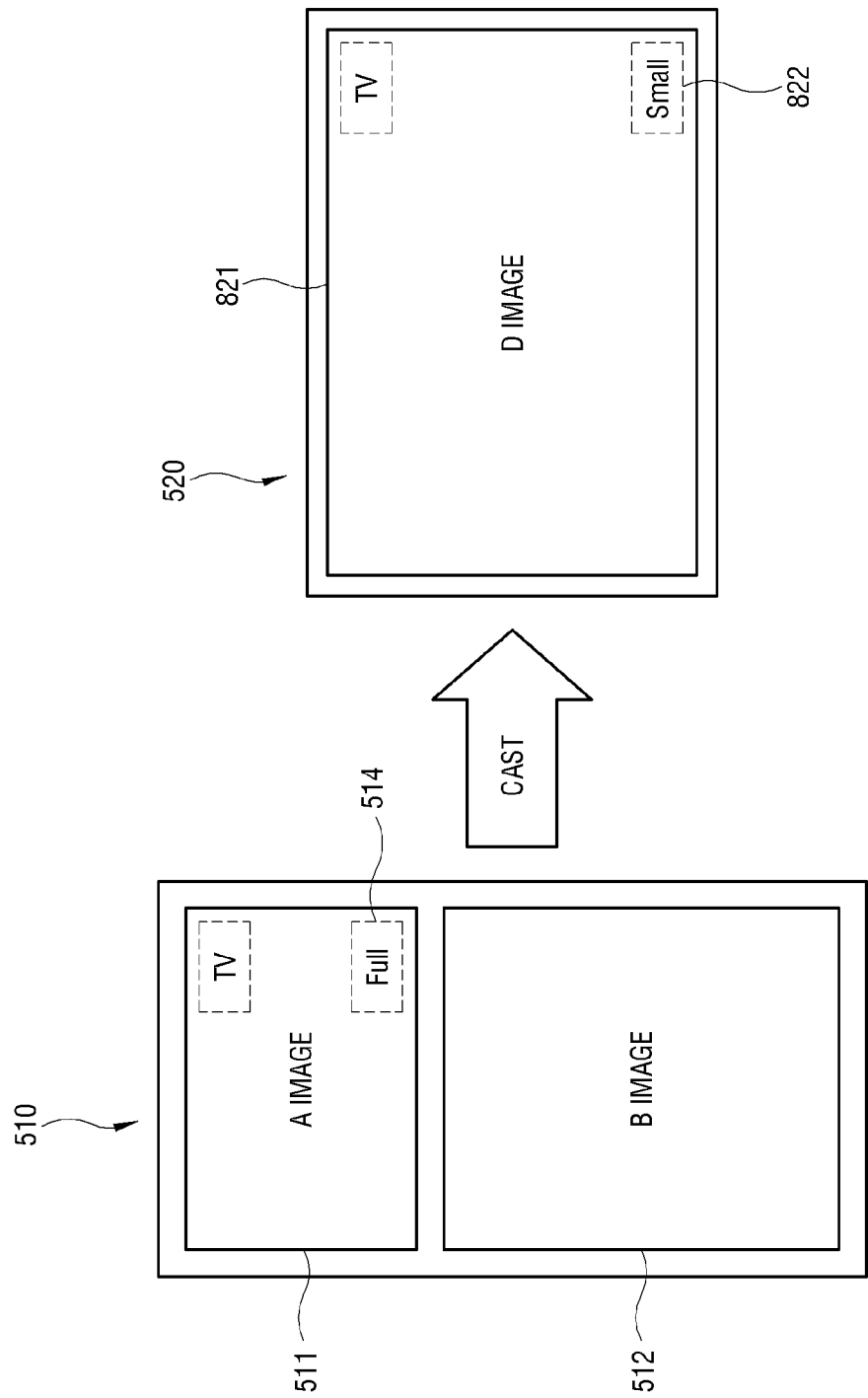
FIG. 8 illustrates an image displayed when a user touches a full-screen option for a second screen in the state of FIG. 5 according to an embodiment.

FIG. 8 illustrates an image displayed when a user touches a full-screen option for a second screen during mirroring operation illustrated in FIG. 5, according to an embodiment.

With reference to FIGS. 5 and 8, when a user touches the full-screen option 524 for the second screen 520, the mobile device controls an image displayed on a first screen 510 to be different from an image displayed on a second screen 520.

When the display apparatus detects a touch input, coordinate information about a position on the second screen, in which the touch input is detected, to the mobile device. The mobile device identifies that the full-screen option for the second screen is touched, based on the received coordinate information. Such an identification method is equivalent to that described above with reference to FIG. 6.

The mobile device continues to display an A image 511 and a B image 512, which are being displayed on the first screen 510, even after detecting the touch input. In other words, the image state of the first screen 510 is not changed by this touch input. Therefore, a full-screen option 514 for the first screen 510 remains displayed as before.

However, the mobile device changes the image state of the second screen 520 in response to this touch input. The mobile device terminates the mirroring function of providing the capture data of the image on the first screen 510 to the display apparatus, and instead changes the transfer protocol into a cast method. As the transfer protocol is changed from the mirroring to the cast, the mobile device transmits a request, by which the display apparatus is requested to display a D image 821 based on the cast method, to the display apparatus.

As described above in the foregoing embodiment, the cast method includes a method by which the mobile device provides undecoded image content data to the display apparatus, and a method by which address information for obtaining the image content data is provided to the display apparatus. In the former method, the mobile device transmits the image content data to the display apparatus in the background, while displaying the image on the first screen 510.

When the display apparatus receives the request from the mobile device and obtains the image content data by the cast method, the display apparatus decodes the obtained data and displays the D image 821 in the full-screen mode on the second screen 520. The D image 821 has a playback area of the full screen, which is more expanded than the playback area of the A image of FIG. 5 displayed on the second screen 520, in response to the touch input of the full-screen option.

The data of the image content of the D image 821 is the same as the data of the image content of the A image 511. However, the data of the D image 821 is decoded by the display apparatus, but the data of the A image 511 is decoded by the mobile device.

The D image 821 may additionally display a size-restoring option 822, i.e., a UI Small, for receiving an input requesting a restoration to an original size of the playback area, e.g., a size during the mirroring operation. As another example, the D image 821 may display a UI for receiving an input requesting a reduction in size of the playback area as compared to an original size. When the size-restoring option 822 is touched in the D image 821, the mobile device restores the second screen 520 to the state of FIG. 5. In other words, the mobile device changes the transfer protocol from the cast to the mirroring, so that the state of the image displayed on the first screen 510 can be displayed on the second screen 520 as before.

For example, when the mobile device is a smartphone and the display apparatus is a TV, the smartphone has a smaller screen size than the TV and often performs many processes at the same time. While the mobile device fitted in one hand has a screen size of about 10 inch, the TV has been developed to have a large screen size of more than 50 inch beyond 40 inch. Therefore, in some cases, the decoding performance of the mobile device may be insufficient to cover the screen of the TV.

In the mirroring, an image displayed on the second screen of the display apparatus is an output of the decoder of the mobile device. This means that enlargement of an image displayed on the second screen may cause the quality of the image to be substantially lowered. When the playback area of the image displayed on the second screen is expanded, a problem of image quality might become substantial.

In this regard, when a user input for enlarging the playback area of the mirroring image is detected from the display apparatus during the mirroring, the mobile device intactly maintains the image state of the first screen but switches the mirroring over to the cast to thereby expand the playback area of the image on the second screen. Thus, it is possible to ensure the quality of the image, of which the playback area is expanded, on the second screen.

Further, according to an embodiment, an operation intuitively intended by a user is carried out with respect to each of a touch input to the first screen of the mobile device and a touch input to the second screen of the display apparatus, thereby providing a mobile device and a display apparatus which are improved in convenience of a user's control.

In embodiments, a user input is carried out by a touch input made on the first screen of the mobile device or the second screen of the display apparatus. However, besides a touch input to the OSD menu on the screen, a user input may be carried out by various user input interfaces provided in the mobile device or the display apparatus. For example, a user input for directing a full-screen mode of an image may be carried out by a button provided in the mobile device or the display apparatus, a remote controller, a touch pad, an on-screen keyboard, a stylus pen, etc.

Figure 9:
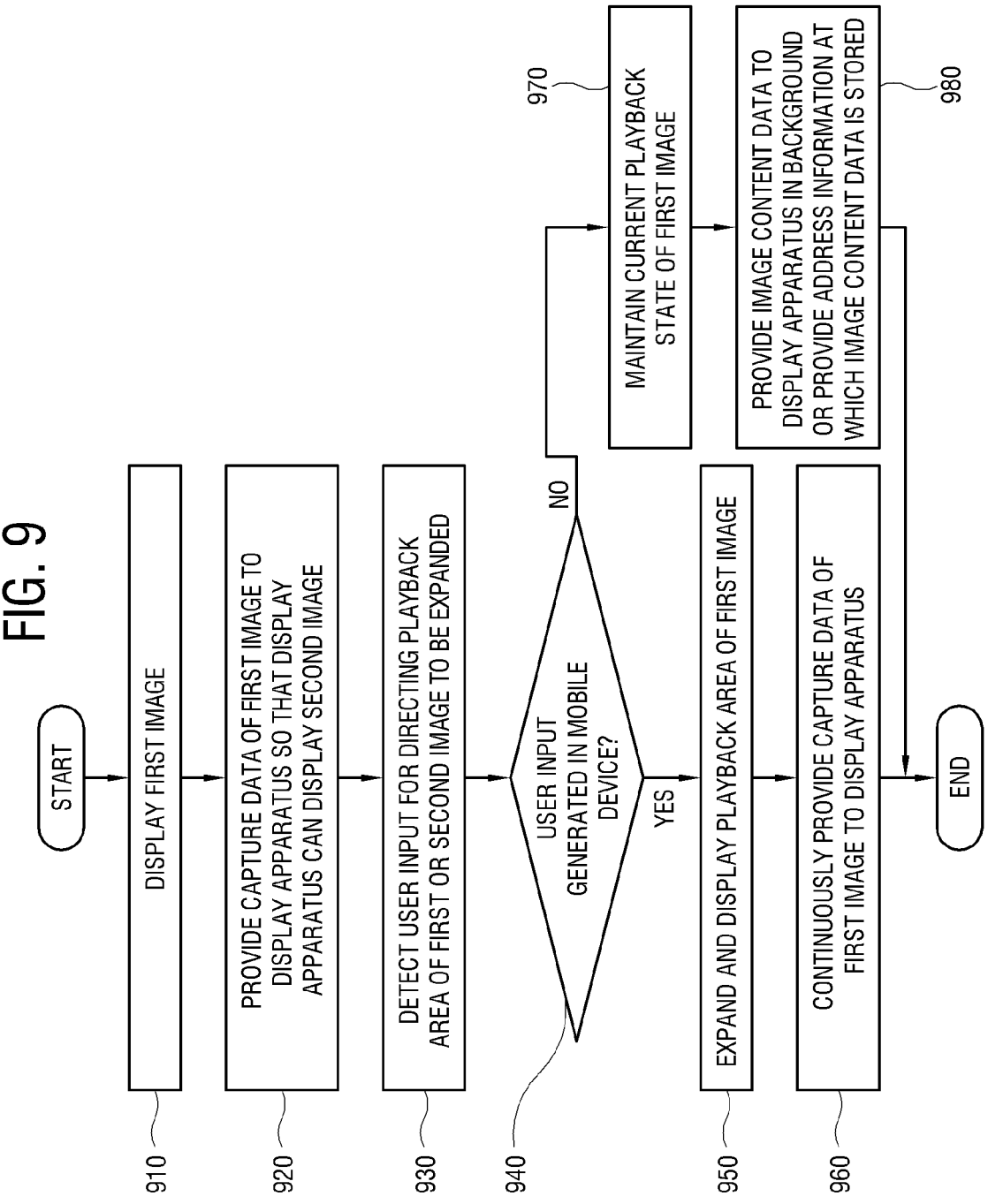
FIG. 9 is a flowchart showing a process by which a mobile device receives a user input for expanding a playback area of an image during mirroring according to an embodiment.

FIG. 9 is a flowchart showing a method performed by the processor of a mobile device when a mobile device receives a user input for expanding a playback area of an image during mirroring, according to an embodiment.

At operation 910, the mobile device displays a first image based on image content data.

At operation 920, the mobile device provides capture data of the first image to the display apparatus, so that the display apparatus can display a second image as a mirroring image of the first image based on the capture data.

At operation 930, the mobile device detects a user input for directing the playback area of the first or second image to be expanded. The expansion for the playback area of the image may for example mean that the playback area of the image being currently displayed is increased in size, as well as displayed as the full-screen mode.

At operation 940, the mobile device identifies whether a detected user input is made in the mobile device.

When it is identified that the user input is made in the mobile device, at operation 950, the mobile device expands and displays the playback area of the first image.

At operation 960, the mobile device continuously provides the capture data of the first image displayed with the expanded playback area to the display apparatus, so that the second image of the display apparatus can also be displayed with the expanded playback area.

When it is identified that the user input is not made in the mobile device but is made in the display apparatus, the mobile device maintains the current playback state of the first image without expanding the playback area of the first image (operation 970).

At operation 980, the mobile device performs a cast-based operation so as to expand the playback area of the second image in the display apparatus. The cast-based operation includes a method of transmitting the image content data to the display apparatus in the background while the mobile device is displaying the first image, or a method of transmitting address information, at which the image content data is stored, to the display apparatus and requesting the display apparatus to obtain the image content data based on the address information.

Below, in the state of FIG. 5, operations of when the outward casting option 513 is touched on the first screen 510 and operations of when the outward casting option 523 is touched on the second screen 520 will be described.

Figure 10:
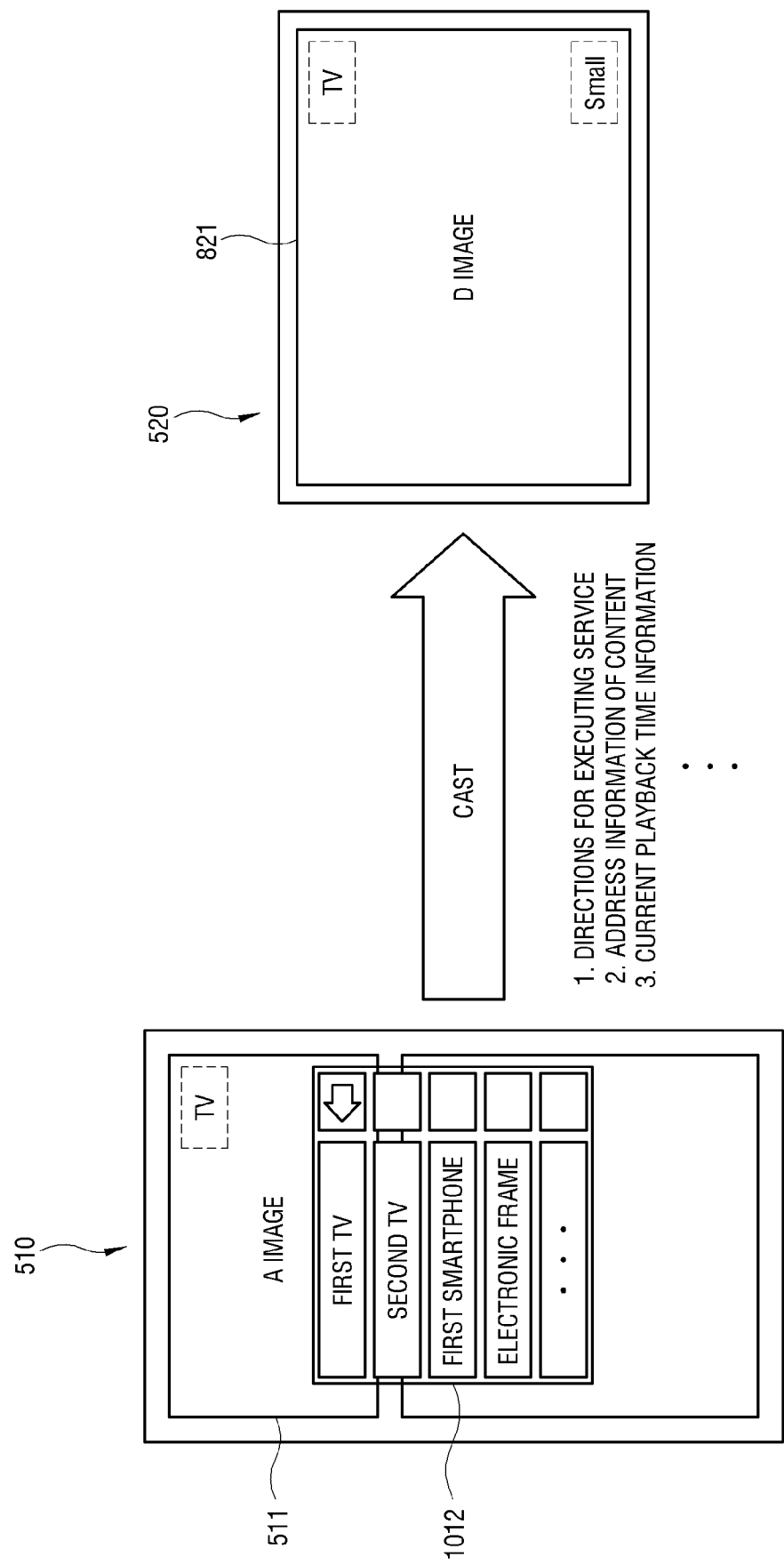
FIG. 10 illustrates a device list displayed on a first screen when an outward cast option on the first screen of a mobile device is touched in the state of FIG. 5 according to an embodiment.

FIG. 10 illustrates a device list displayed on a first screen when an outward cast option on the first screen of a mobile device is touched during the mirroring operation shown in FIG. 5, according to an embodiment.

With reference to FIGS. 5 and 10, when the outward casting option 513 is touched on the first screen 510 during the mirroring, the mobile device additionally displays a list 1012 of many external apparatuses, with which the mobile device can communicate, on a first screen 510. The list 1012 provides options of external apparatuses capable of displaying an image and supporting the transfer protocol of the cast method among the external apparatuses with which the mobile device can communicate.

When a user selects a display apparatus, which is being currently under the mirroring or another external apparatus, in the list 1012, the mobile device stops the mirroring and starts an outward casting operation to the selected display apparatus. In other words, the mobile device may transmit undecoded image content data to the display apparatus or provides address information about a server, in which the image content data is stored, to the display apparatus, so that the display apparatus can obtain the image content data based on the address information.

For example, when the mobile device displays an A image 511 received from a moving-image content service of the Internet, the mobile device performs the outward casting operation as follows. The mobile device stops transmitting the capture data of the A image 511 to the display apparatus in response to selection of the display apparatus on the list 1012. The mobile device transmits a request involving directions for executing a service of providing image content of the A image 511, address information for obtaining the image content, playback time information about a current playback point in time within the total running time of the A image 511, etc. to the display apparatus.

The display apparatus executes an application prepared for accessing the moving-image content service in response to the request from the mobile device, and thus accesses the corresponding service. The display apparatus receives the image content based on the address information of the accessed service, and plays back the received image content from the corresponding point in time, thereby displaying a D image 821 on a second screen 520.

As a result, the A image 511 is displayed on the first screen 510, but the D image 821 different in a decoding source from the A image 511 is displayed on the second screen 520. In addition, a control menu for controlling the playback state of the D image 821 displayed on the second screen 520 may be displayed on the first screen 510 of the mobile device. In other words, the mobile device may serve as a remote controller for controlling the D image 821 displayed on the display apparatus.

Figure 11:
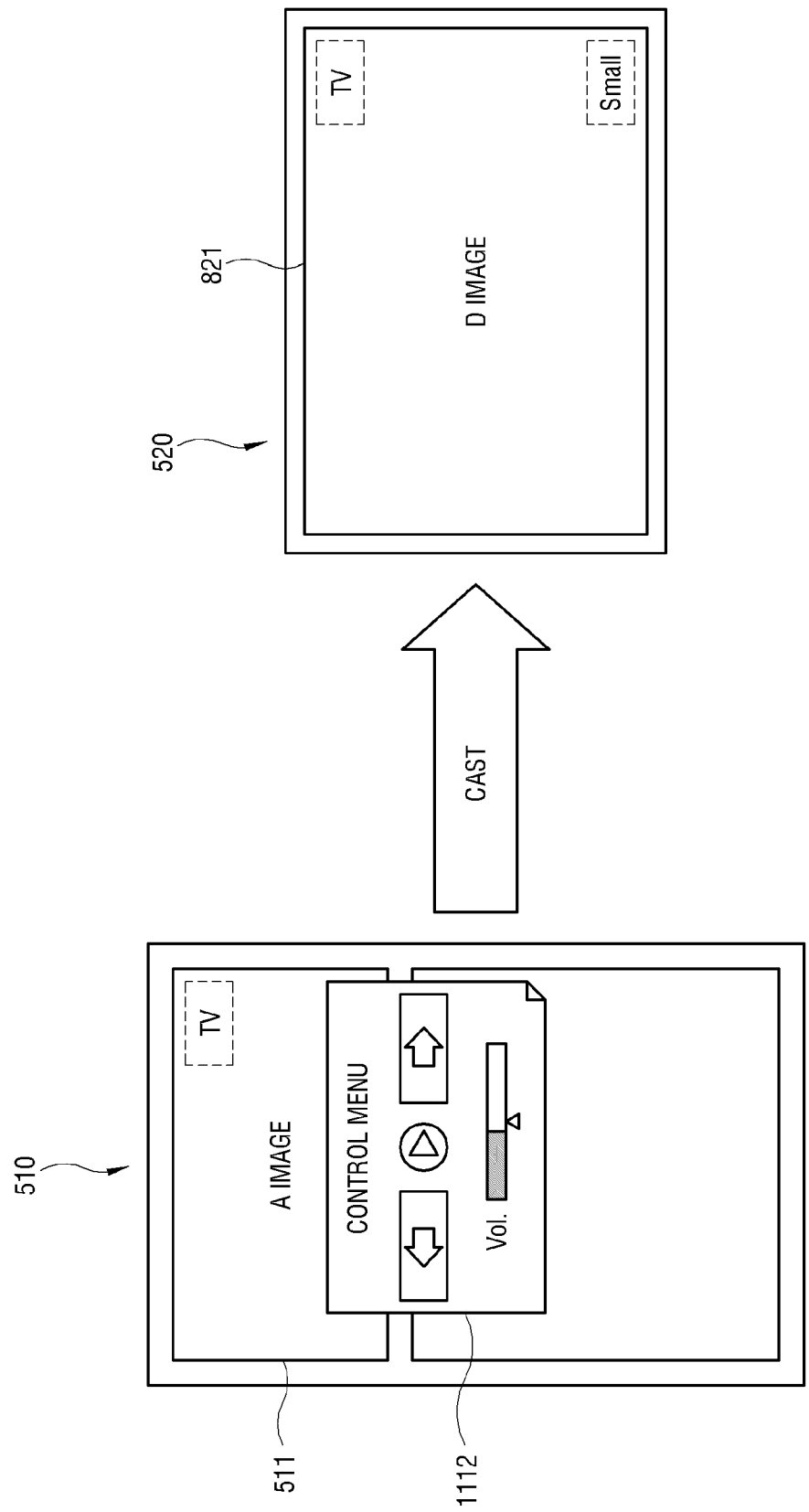
FIG. 11 illustrates an image displayed when an outward cast option on a second screen of a mobile device is touched in the state of FIG. 5 according to an embodiment.

FIG. 11 illustrates an image displayed when an outward casting option on a second screen of a display apparatus is touched during mirroring as shown in FIG. 5, according to an embodiment.

With reference to FIGS. 5 and 11, when the outward casting option 523 of the second screen 520 is touched during the mirroring, the mobile device performs an outward casting operation as follows. The mobile device does not display the list 1012 (see FIG. 10) for selecting the external apparatus to which the casting operation is applied. Instead, the mobile device identifies that the display apparatus is selected as a target to be subjected to the casting operation, based on that a user input is made in the display apparatus.

The mobile device stops transmitting the capture data of the A image 511 to the display apparatus, thereby terminating the mirroring that has been performed. The mobile device transmits a request involving directions for executing a service of providing image content of the A image 511, address information for obtaining the image content, playback time information about a current playback point in time within the total running time of the A image 511, etc. to the display apparatus.

The display apparatus executes an application prepared for accessing the moving-image content service in response to the request from the mobile device, and thus accesses the corresponding service. The display apparatus receives the image content based on the address information of the accessed service, and plays back the received image content from the corresponding point in time, thereby displaying a D image 821 on a second screen 520.

A control menu 1112 for controlling the playback state of the D image 821 displayed on the second screen 520 may be displayed on the first screen 510 of the mobile device. This control menu 1112 may be identically displayed even in the foregoing embodiment of FIG. 10. The control menu 1112 may for example include various options such as a playback button for directing the playback of the D image 821, a stop button for stopping the playback of the D image 821, other content playback buttons for playing back previous content or next content among pieces of content provided by the service, a volume controller for controlling the volume of the D image 821, etc. Thus, the mobile device may transmit a control signal for controlling the playback state of the D image 821 to the display apparatus in response to a user input to the control menu 1112.

The mobile device displays this list on the first screen 510 when it is identified that a user input for an outward casting request is made in the mobile device. On the other hand, the mobile device does not display this list on the first screen 510 when it is identified that the user input for an outward casting request is not made in the mobile device but is made in the display apparatus.

Figure 12:
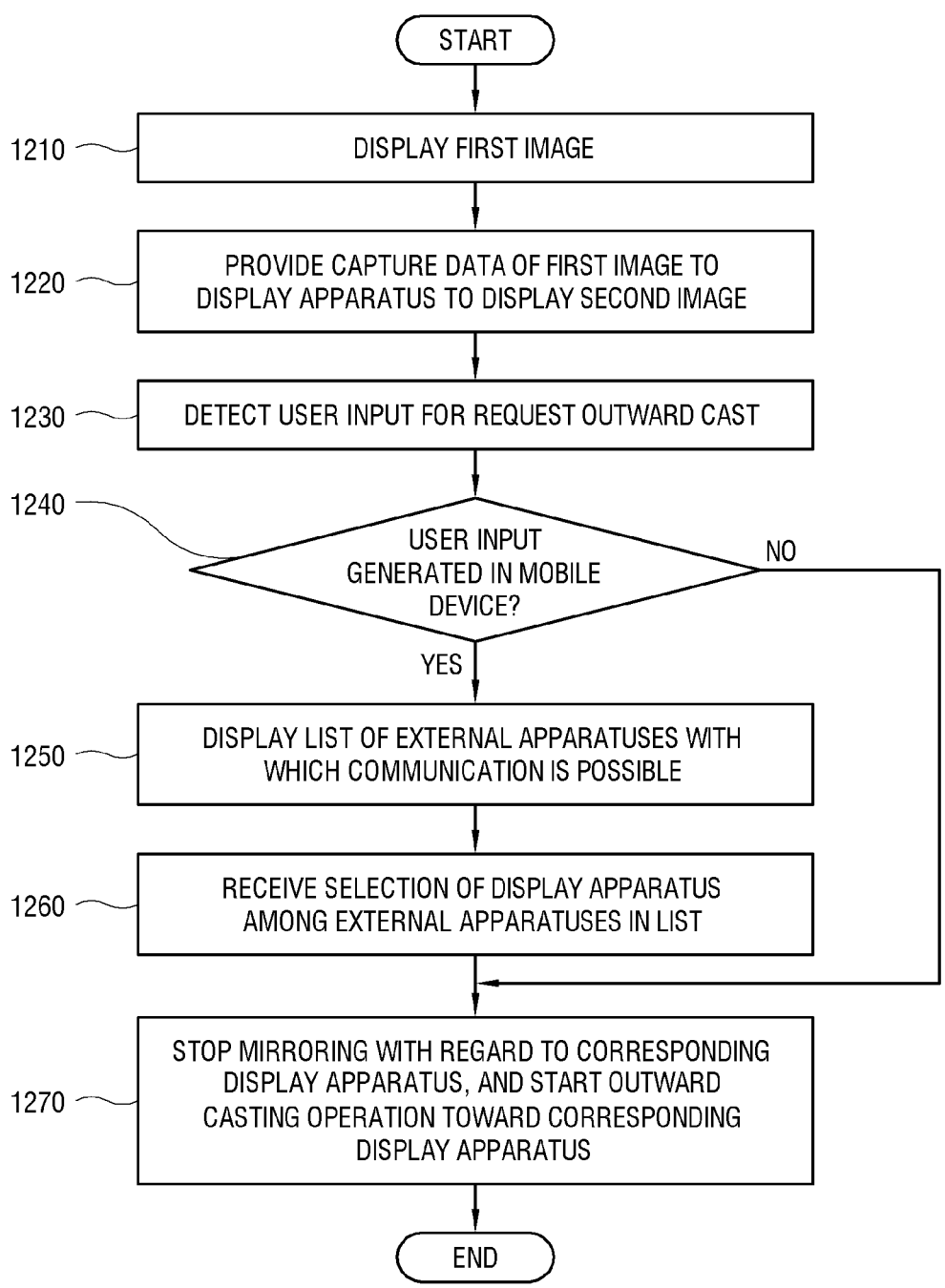
FIG. 12 is a flowchart showing a process by which a mobile device receives a user input for requesting an outward cast during mirroring according to an embodiment.

FIG. 12 is a flowchart showing a method performed by the processor of the mobile device when a mobile device receives a user input for requesting an outward cast during mirroring according to an embodiment.

At operation 1210, the mobile device displays a first image based on image content data.

At operation 1220, the mobile device provides capture data of the first image to the display apparatus, so that the display apparatus can display a second image, i.e., a mirroring image of the first image based on the capture data.

At operation 1230, the mobile device detects a user input for requesting an outward cast.

At operation 1240, the mobile device identifies whether the detected user input is made in the mobile device.

When it is identified that the user input is made in the mobile device, the mobile device displays a list of external apparatuses with which communication is possible (operation 1250).

At operation 1260, the mobile device receives selection of a display apparatus among the external apparatuses in the list.

At operation 1270, the mobile device stops mirroring with regard to the corresponding display apparatus, and starts an outward casting operation to the corresponding display apparatus. The outward casting operations of the mobile device are equivalent to those described above.

When it is identified that a user input is not made in the mobile device but is made in the display apparatus, the mobile device proceeds to the operation 1270.

Below, operations of the mobile device will be described under the condition that the mobile device and the display apparatus are connected for communication. The mobile device is one of the types of the electronic apparatus, and the display apparatus may for convenience of description be called an external apparatus to be distinguished from the electronic apparatus, e.g., the mobile device.

Figure 13:
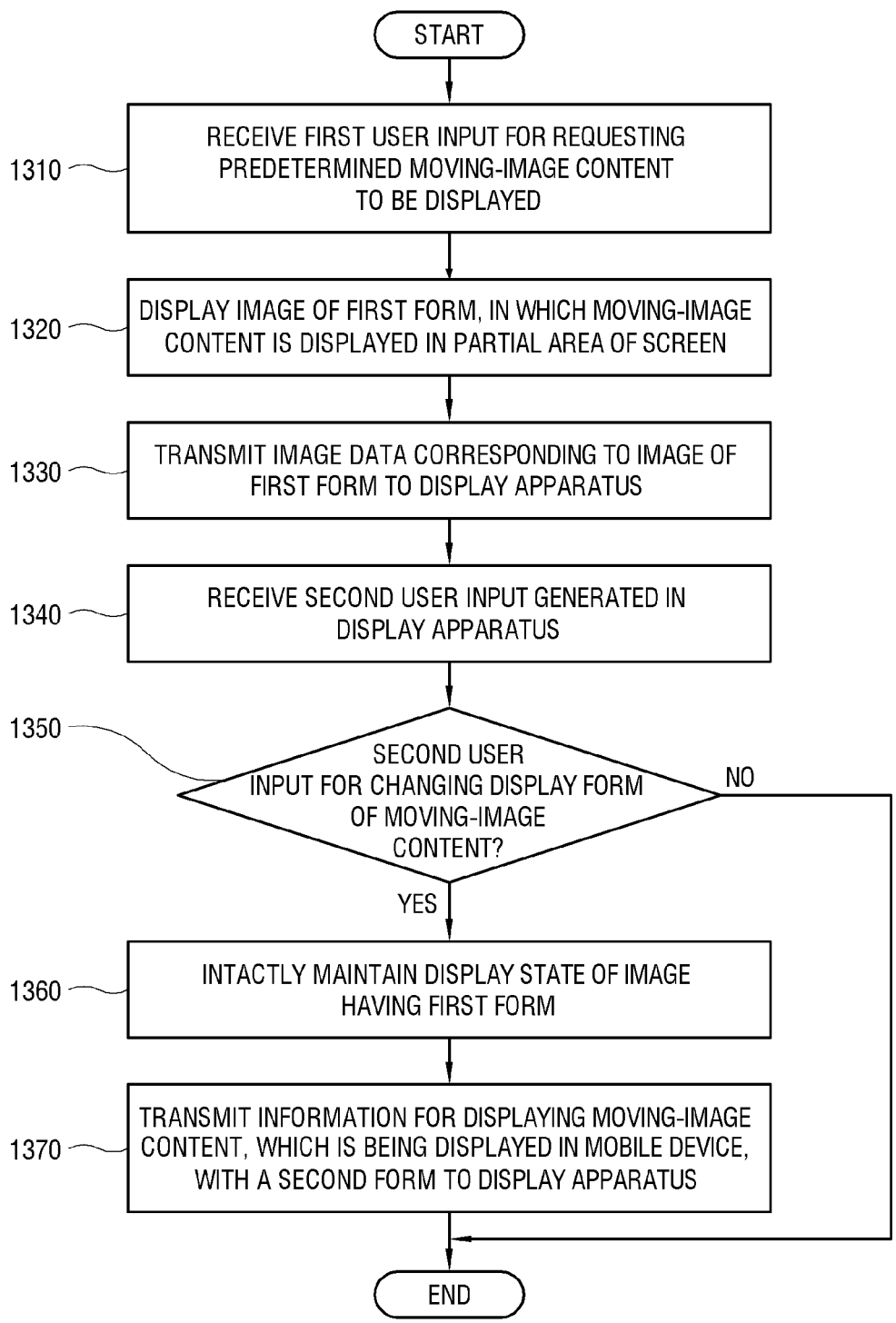
FIG. 13 is a flowchart showing a control method of a mobile device according to an embodiment.

FIG. 13 is a flowchart showing a control method of a mobile device according to an embodiment.

As shown in FIG. 13, the following operations are performed by the processor of the mobile device.

At operation 1310, the mobile device receives a first user input for requesting predetermined moving-image content to be displayed.

At operation 1320, the mobile device displays an image of a first form, in which the moving-image content is displayed in a partial area of the screen, in response to the received first user input. This first form corresponds to a state that the image of the moving-image content is displayed in the partial area within the entire screen on which the mobile device can display the image.

At operation 1330, the mobile device transmits image data corresponding to the image of the first form to the display apparatus while displaying the image of the first form. Thus, the display apparatus can display the image of the first form identical to the image displayed on the mobile device, i.e., display a mirroring image. The mobile device transmits image data corresponding to the image of the first form to the display apparatus based on a first transfer protocol. The image of the first form displayed by the mobile device may include a UI item provided to be selectable by a user to change the display form of the moving-image content.

At operation 1340, the mobile device receives a second user input made in the display apparatus, while transmitting the image data to the display apparatus and/or while the image is displayed on the display apparatus.

At operation 1350, the mobile device identifies whether the second user input directs change in the display form of the moving-image content, as for example, when a user touches the UI item provided to change the display form of the moving-image content on the mirroring image displayed on the display apparatus. The display apparatus transmits the second user input involving touched coordinate information to the mobile device. When it is identified that the coordinate information associated with the second user input corresponds to a display position of the UI item, the mobile device may identify that the corresponding UI item is touched.

When it is identified that the second user input does not direct the change in the display form of the moving-image content, the mobile device maintains the current mirroring operation.

On the other hand, when it is identified that the second user input directs the change in the display form of the moving-image content, the mobile device intactly maintains the display state of the image having the first form (operation 1360). Further, at operation 1370, the mobile device transmits information for displaying the moving-image content with a second form different from the first form to the display apparatus. The mobile device transmits the information based on a second transfer protocol different from the first transfer protocol. In this case, the display apparatus displays an image of the moving-image content based on the received information, in which the image is not the mirroring image of the image being displayed in the mobile device.

Here, the information for displaying the moving-image content with the second form may for example be a file of the moving-image content stored in the storage unit of the mobile device, or address information from which the moving-image content is obtainable. When this information is given as the file of the moving-image content, the second transfer protocol may for example include a cast transfer method.

While the display apparatus is displaying the image of the moving-image content based on the received information, the mobile device may receive a third user input made in the display apparatus, e.g., on UI Small shown in FIG. 8. When it is identified that the third user input directs the moving-image content to be restored to the first form, the mobile device transmits image data corresponding to the image, which is being currently displayed in the mobile device, to the display apparatus. Thus, the display apparatus displays the mirroring image of the image being displayed in the mobile device.

The second user input may be made in the mobile device, while the mobile device is displaying the image of the first form and transmitting the image data corresponding to the image of the first form to the display apparatus. When it is identified that the second user unit made in the mobile device directs the change in the display form of the moving-image content, e.g., a UI Full is activated, the mobile device displays the image by changing the display form of the moving-image content into the second form and transmits the image data corresponding to the moving-image content displayed with the second form to the display apparatus. In other words, the display apparatus in this case intactly displays the mirroring image of the image being displayed in the mobile device.

The above-described operations of the apparatus may be performed by artificial intelligence provided in the corresponding apparatus. The artificial intelligence may be applied to various related art systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium. The computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing embodiments. The program instruction recorded in this storage unit medium may be specifically designed and configured according to embodiments, or may be available to those skilled in the art. The computer program instruction may be implemented by a computer program product.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic apparatus comprising:
   a display having a first screen;
   a communication circuit configured to communicate with an external apparatus; and
   a processor configured to:
      display a first content image corresponding to a content on a part of the first screen,
      transmit first data corresponding to the first screen to the external apparatus through the communication circuit, such that a second content image corresponding to the content is displayed on a part of a second screen of the external apparatus based on the first data, the part of the first screen corresponding to the part of the second screen, and
      in response to receiving, from the external apparatus, a signal corresponding to a user input to request a change in a display size of the second content image, transmit second data to the external apparatus through the communication circuit, such that a third content image corresponding to the content and having a display size different from the display size of the second content image is displayed on the second screen of the external apparatus based on the second data, and maintain displaying the first content image on the part of the first screen.

2. The electronic apparatus according to claim 1, wherein the display size of the third content image is larger than the display size of the second content image.

3. The electronic apparatus according to claim 1, wherein the request to display the content as the third content image comprises at least one of a file of the content or address information from which the content is obtainable.

4. The electronic apparatus according to claim 1, wherein the second content image comprises a menu item for selecting the change in the display size of the second content image, and
   the processor is further configured to identify that the first user input is to request the change in the display size of the second content image, based on whether coordinate information on a screen of the external apparatus obtained from the user input corresponds to a position of the menu item.

5. The electronic apparatus according to claim 1, wherein the processor is further configured to:
   transmit the first data to the external apparatus through the communication circuit, based on a first transfer protocol, and
   transmit the request to display the content as the third content image based on a second transfer protocol different from the first transfer protocol.

6. The electronic apparatus according to claim 1, further comprising a user input receiver,
   wherein the processor is further configured to:
      identify whether a second user input generated through the user input receiver is to request a change in the display size of the first content image,
      display the content as a fourth content image comprising a display size different from the display size of the first content image on the display, based on the second user input identified to request the change in the display size of the first content image, and
      transmit data of the fourth content image to the external apparatus through the communication circuit.

7. The electronic apparatus according to claim 1, wherein the processor is further configured to:
   identify whether a second user input generated in the external apparatus displaying the third content image is to request a restoration of the display size of the second content image, and
   transmit the first data again to the external apparatus through the communication circuit, based on the second user input identified to request the restoration of the display size of the second content image.

8. The electronic apparatus according to claim 1, further comprising a user input receiver,
   wherein the external apparatus is one of a plurality of external apparatuses connectable to the electronic apparatus, and
   the processor is further configured to:
      based on a second user input generated through the user input receiver and identified to request an outward cast for the content, display a list of the plurality of external apparatuses on the display, and
      perform an outward casting operation for the content toward one of the plurality of external apparatuses, based on a third user input selecting the one of the plurality of external apparatuses in the list.

9. A method of controlling an electronic apparatus, the method comprising:
   displaying a first content image corresponding to a content on a part of a first screen of a display of the electronic apparatus;
   transmitting first data corresponding to the first screen to an external apparatus, such that a second content image corresponding to the content is displayed on a part of a second screen of the external apparatus based on the first data, the part of the first screen corresponding to the part of the second screen; and
   in response to receiving, from the external apparatus, a signal corresponding to a user input to request a change in a display size of the second content image, transmitting second data to the external apparatus, such that a third content image corresponding to the content and having a display size different from the display size of the second content image is displayed on the second screen of the external apparatus based on the second data, and maintaining displaying the first content image on the part of the first screen.

10. The method according to claim 9, wherein the display size of the third content image is larger than the display size of the second content image.

11. The method according to claim 9, wherein the request to display the content as the third content image comprises at least one of a file of the content or address information from which the content is obtainable.

12. The method according to claim 9, wherein the second content image comprises a menu item for selecting the change in the display size of the second content image, and
the user input is identified to request the change in the display size of the second content image, based on whether coordinate information on a screen of the external apparatus obtained from the user input corresponds to a position of the menu item.

13. The method according to claim 9, wherein the transmitting the first data to the external apparatus further comprises transmitting the first data to the external apparatus based on a first transfer protocol, and
the transmitting the request further comprises transmitting the request to display the content as the third content image based on a second transfer protocol different from the first transfer protocol.

14. The method according to claim 9, further comprising:
identifying whether a second user input generated in the electronic apparatus is to request a change in the display size of the first content image;
displaying the content as a fourth content image comprising a display size different from the display size of the first content image, based on the second user input identified to request the change in the display size of the first content image; and
transmitting data of the fourth content image to the external apparatus.

15. The method according to claim 9, further comprising:
identifying whether a second user input generated in the external apparatus displaying the third content image is to request a restoration of the display size of the second content image; and
transmitting the first data again to the external apparatus, based on the second user input identified to request the restoration of the display size of the second content image.

16. The method according to claim 9, wherein the external apparatus is one of a plurality of external apparatuses connectable to the electronic apparatus, and
wherein the method further comprises:
based on a second user input generated in the electronic apparatus and identified to request an outward cast for the content, displaying a list of the plurality of external apparatuses; and
performing an outward casting operation for the content toward one of the plurality of external apparatuses, based on a third user input selecting the one the plurality of external apparatuses in the list.

17. An electronic apparatus comprising:
a display;
a communication circuit configured to communicate with an external apparatus; and
a processor configured to:
display moving-image content as an image of a first form in a partial area of a screen of the display, based on a first user input for requesting the moving-image content to be displayed,
transmit image data corresponding to the image of the first form to the external apparatus through the communication circuit based on a first transfer protocol, while displaying the image of the first form on the display,
based on identifying that a second user input is generated in the external apparatus while the image of the first form is displayed therein, identify whether the second user input is to request a change in a display form of the moving-image content, and
based on the second user input identified to request the change in the display form of the moving-image content, maintain the image in the first form to be displayed on the display, and transmit information for allowing the external apparatus to display the moving-image content, which is being displayed on the display of the electronic apparatus, in a second form different from the first form, to the external apparatus through the communication circuit based on a second transfer protocol different from the first transfer protocol.

18. The electronic apparatus of claim 17, wherein the processor is further configured to, based on the second user input, transmit the information for allowing the external apparatus to display the moving-image content in a screen size larger that a screen size of the partial area of the screen of the display.

19. The electronic apparatus of claim 17, wherein the processor is further configured to:
based on identifying that the second user input is generated in the electronic apparatus, change the image of the first form to the image of the second form,
display the image of the second form on the display, and
transmit the image of the second form to the external apparatus for allowing the external apparatus to display the moving-image content in the second form.

* * * * *